J. C. DONNELLY.
VENEER FEEDING AND HANDLING MACHINE.
APPLICATION FILED MAR. 29, 1919.
1,360,275.
Patented Nov. 30, 1920.
11 SHEETS—SHEET 3.
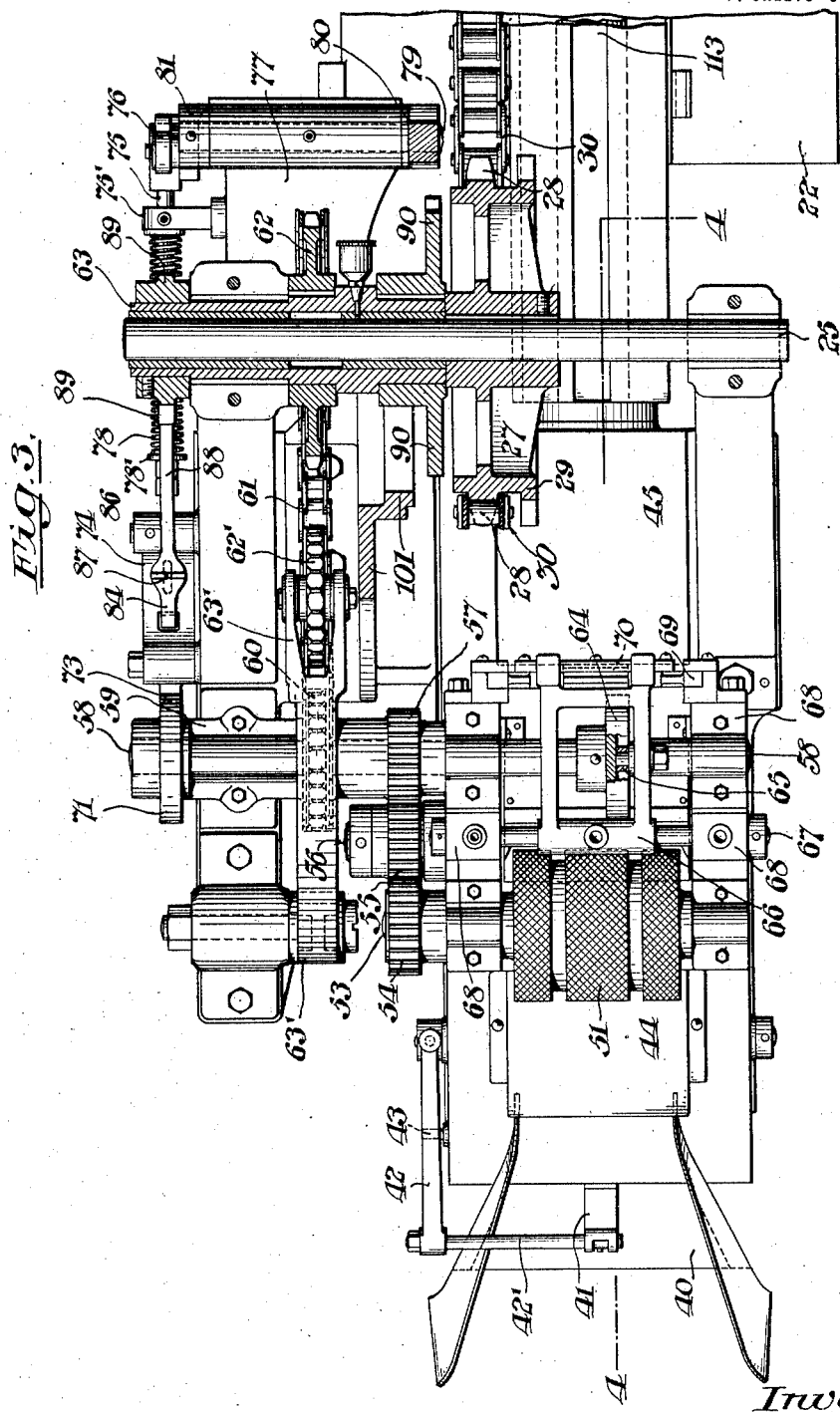
Inventor:
Joseph C. Donnelly
By John F. Nolan
Attorney.

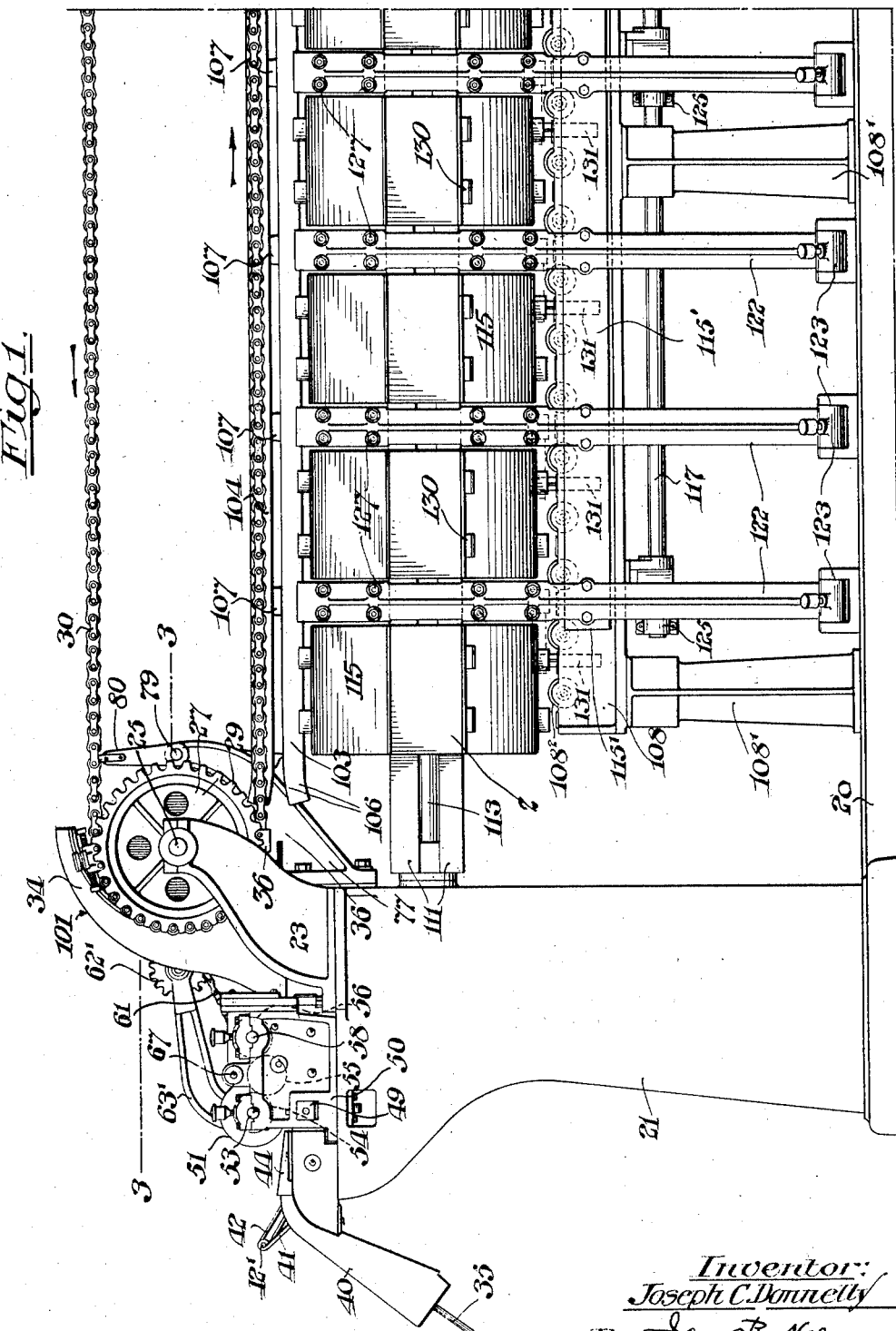

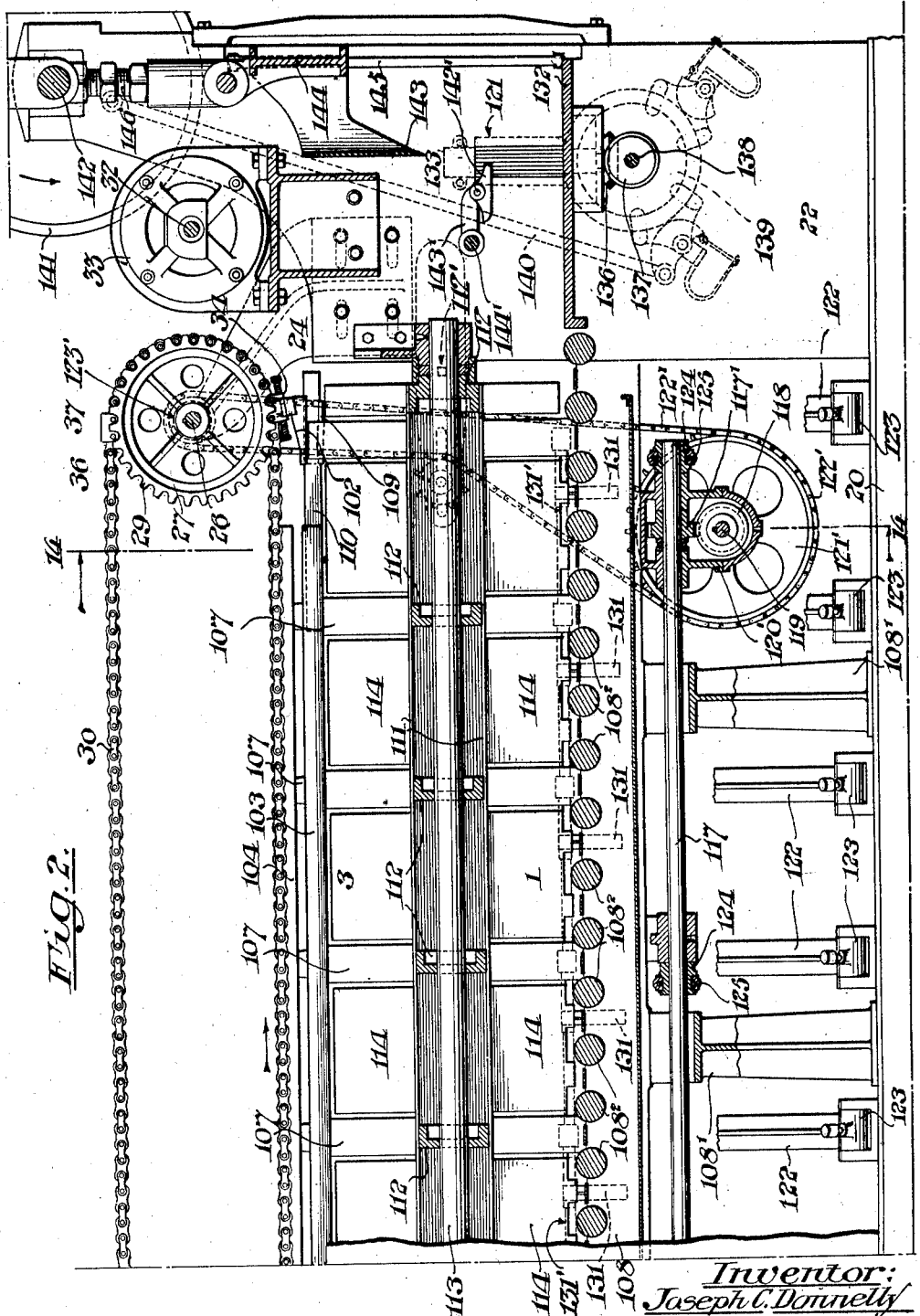

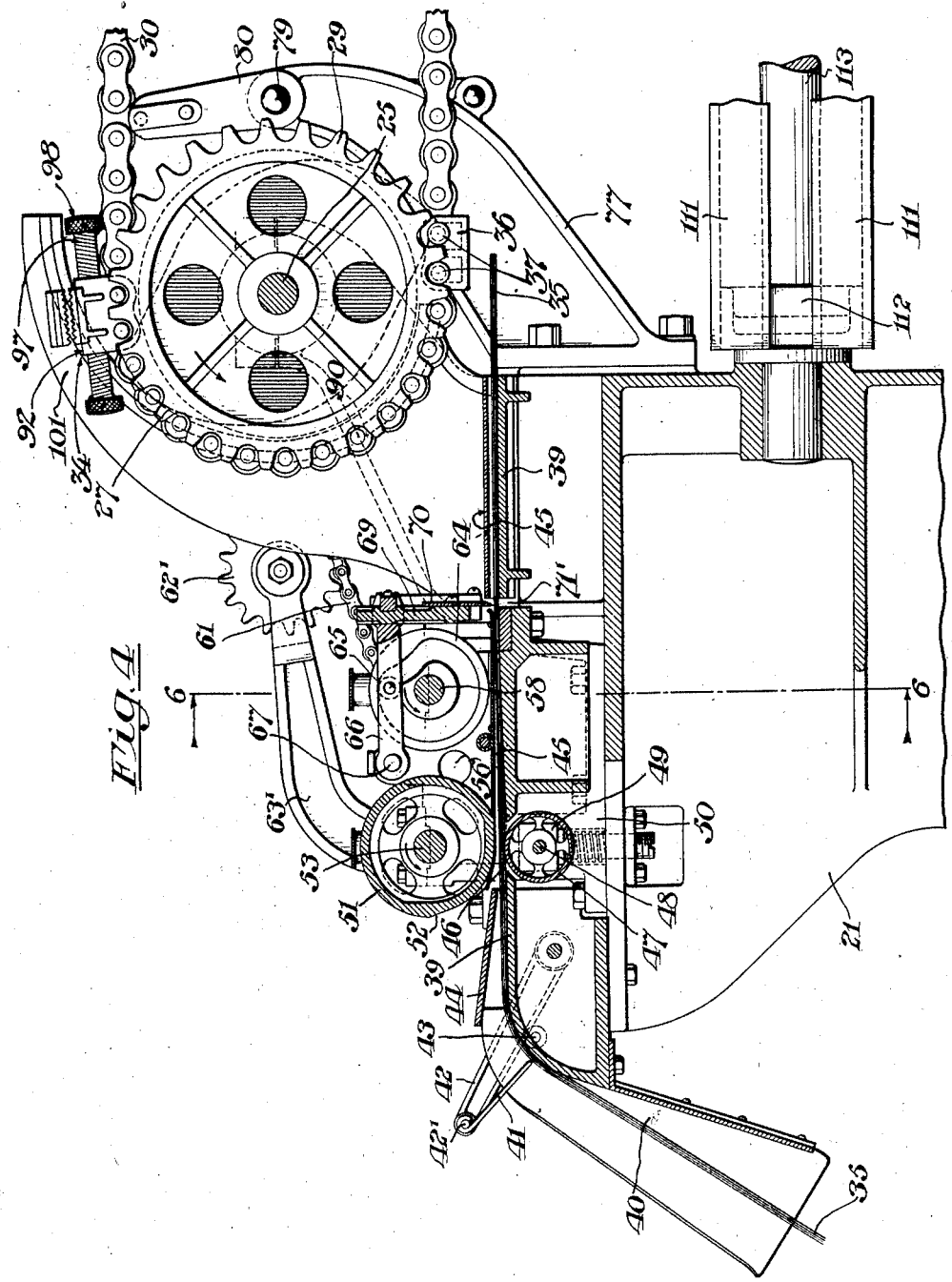

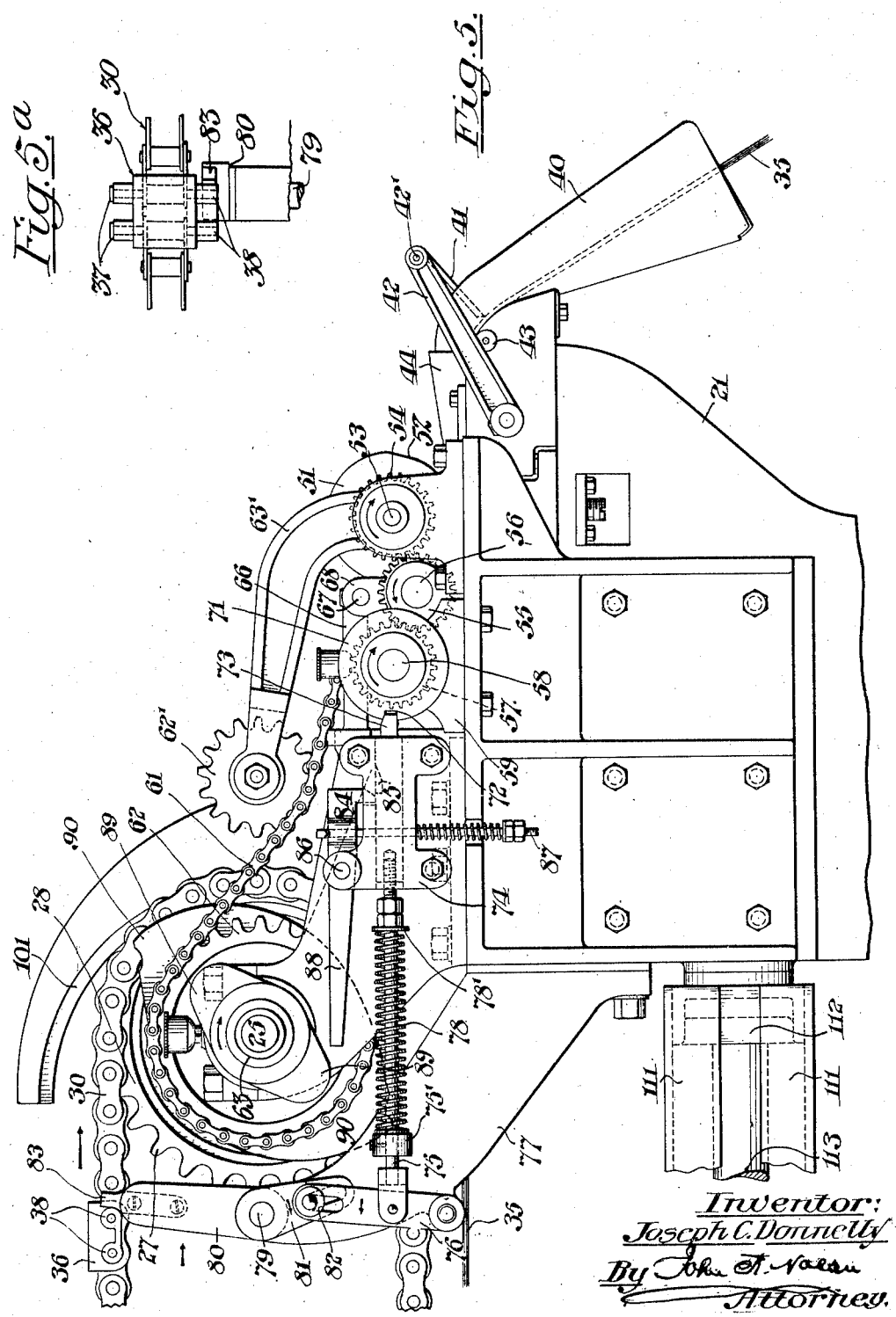

J. C. DONNELLY.
VENEER FEEDING AND HANDLING MACHINE.
APPLICATION FILED MAR. 29, 1919.
1,360,275.
Patented Nov. 30, 1920.
11 SHEETS—SHEET 6.
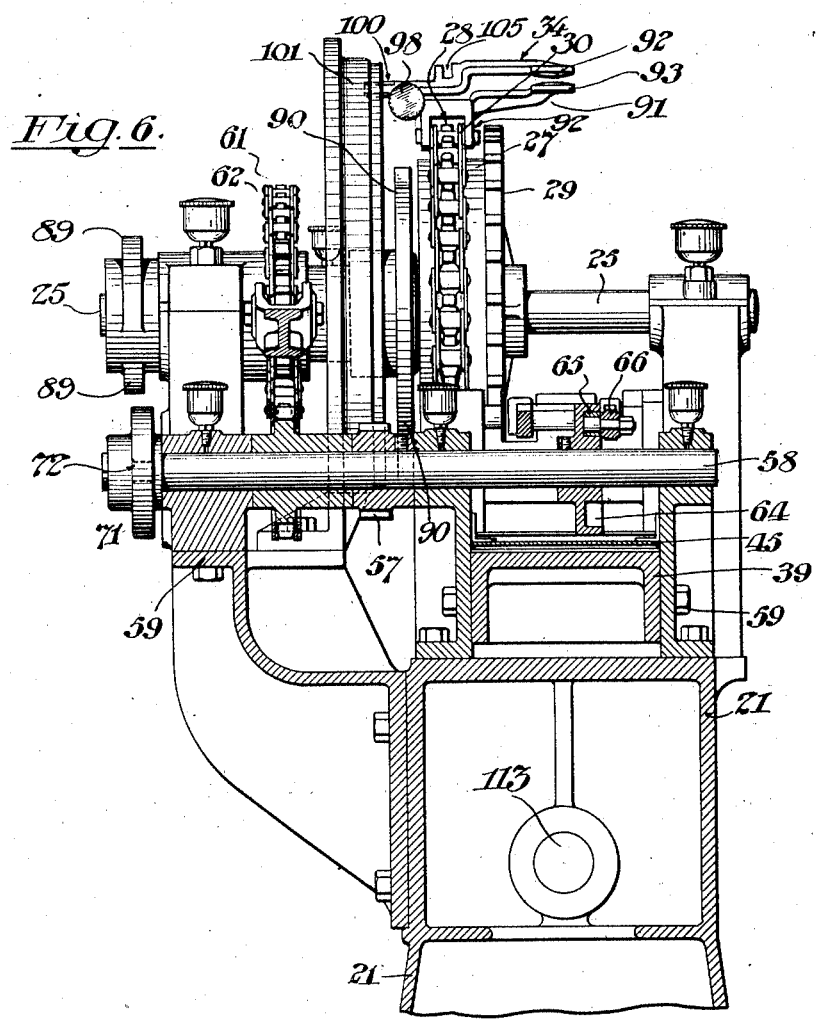
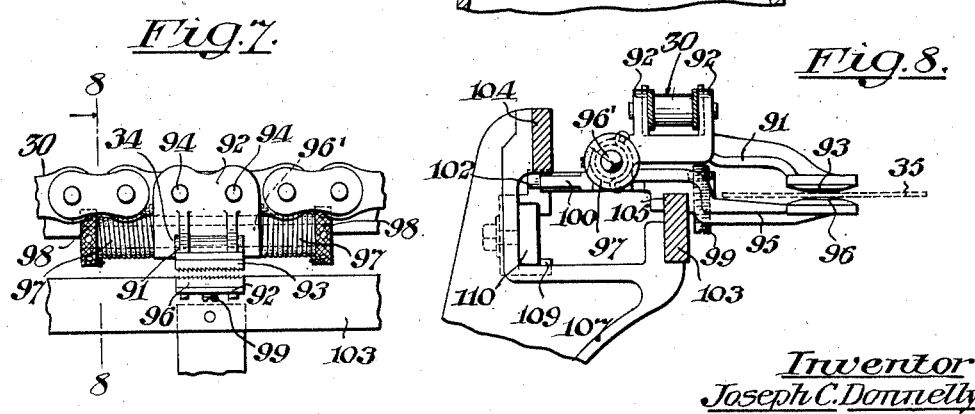

J. C. DONNELLY.
VENEER FEEDING AND HANDLING MACHINE.
APPLICATION FILED MAR. 29, 1919.
1,360,275.
Patented Nov. 30, 1920.
11 SHEETS—SHEET 7.
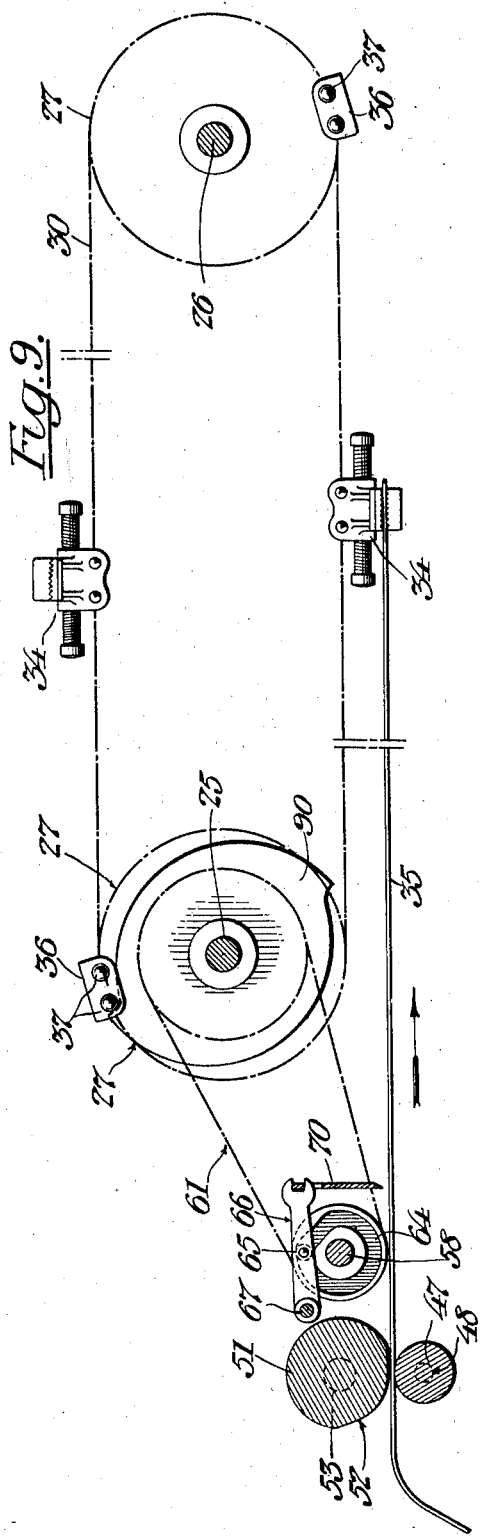
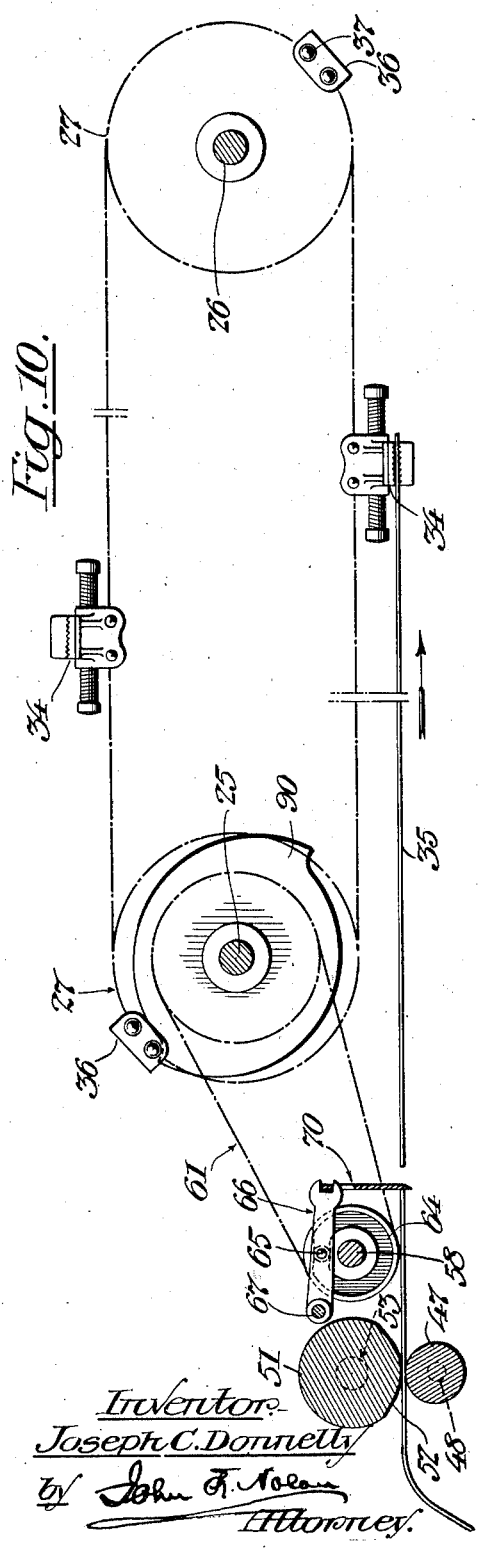
Inventor:
Joseph C. Donnelly
by John F. Nolan
Attorney.

J. C. DONNELLY.
VENEER FEEDING AND HANDLING MACHINE.
APPLICATION FILED MAR. 29, 1919.
1,360,275.
Patented Nov. 30, 1920.
11 SHEETS—SHEET 8.
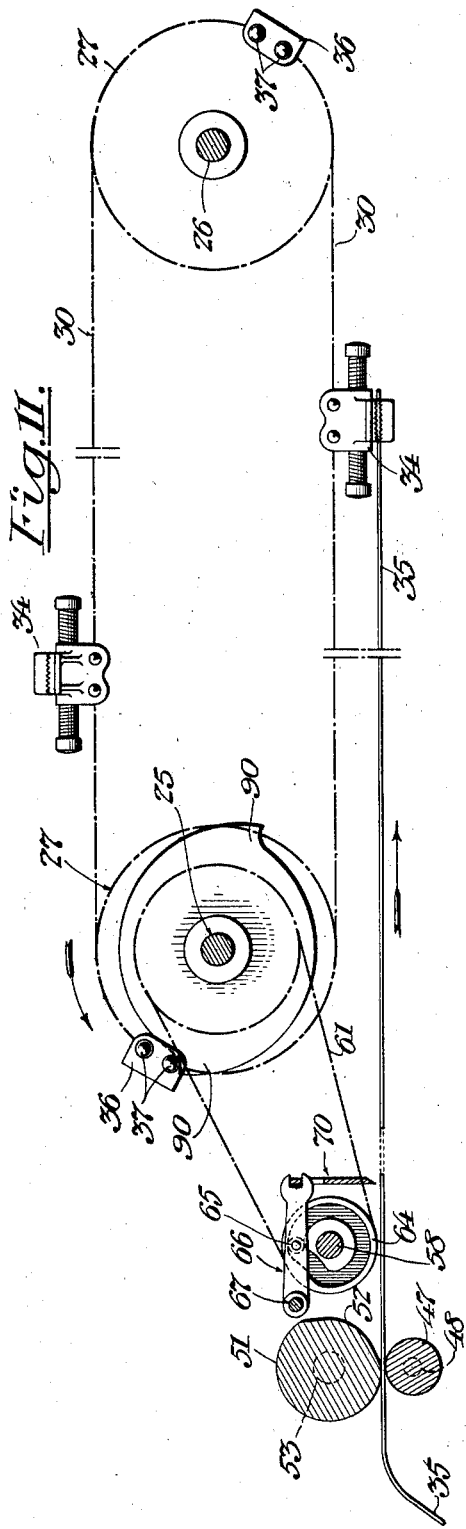
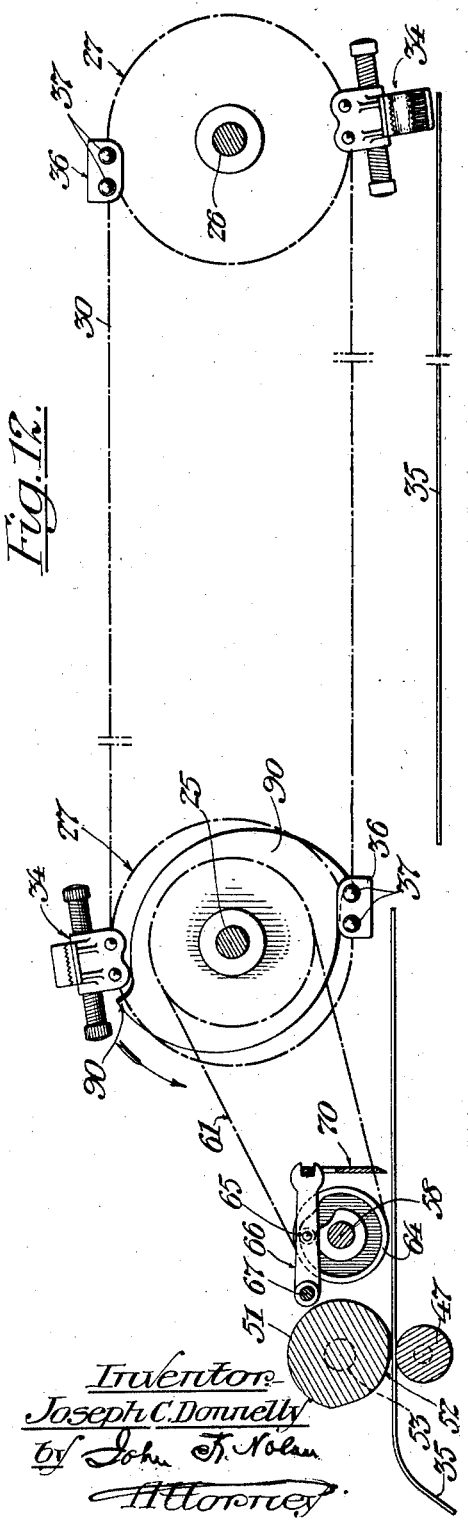
Inventor
Joseph C. Donnelly
by John F. Nolan
Attorney

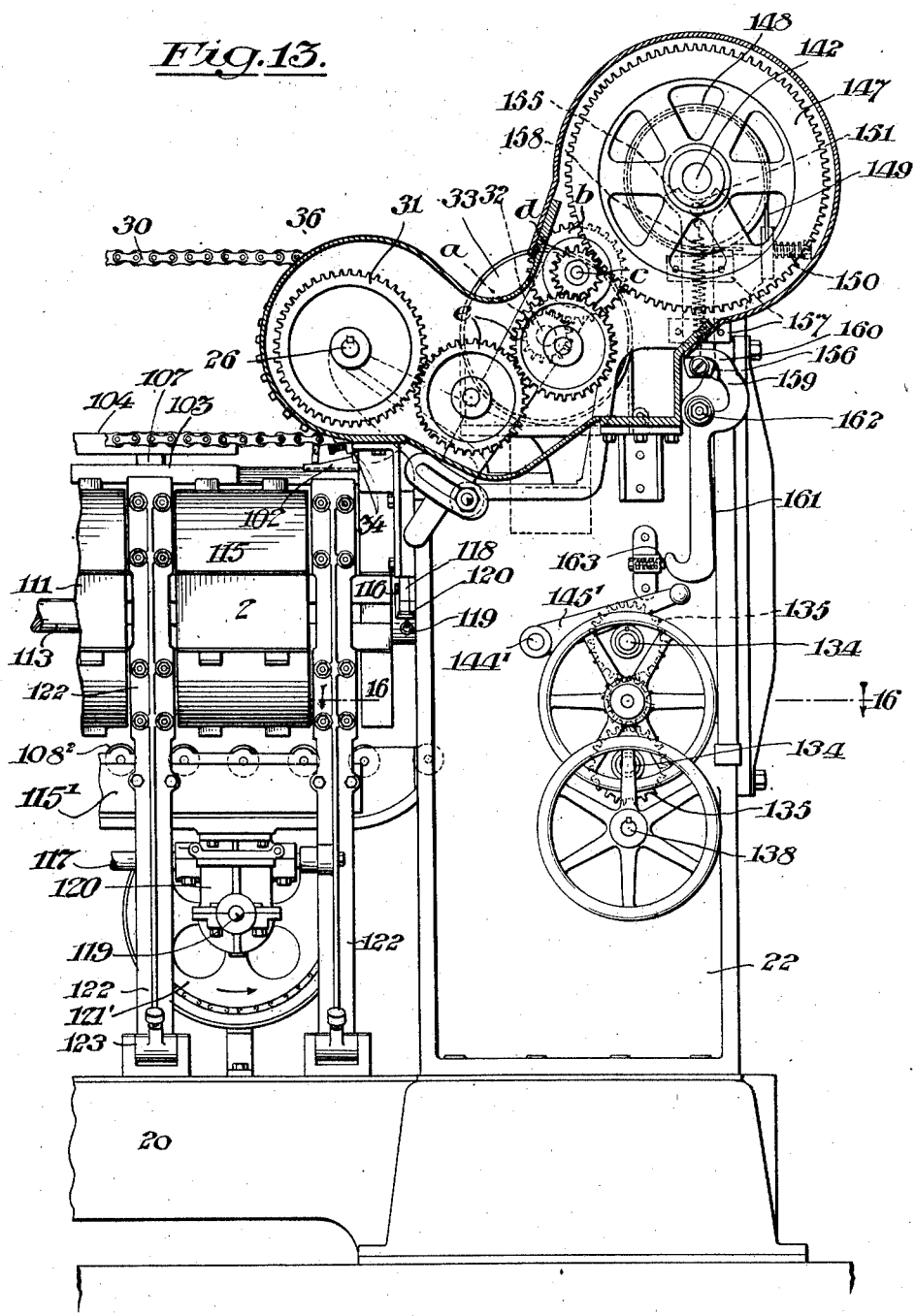

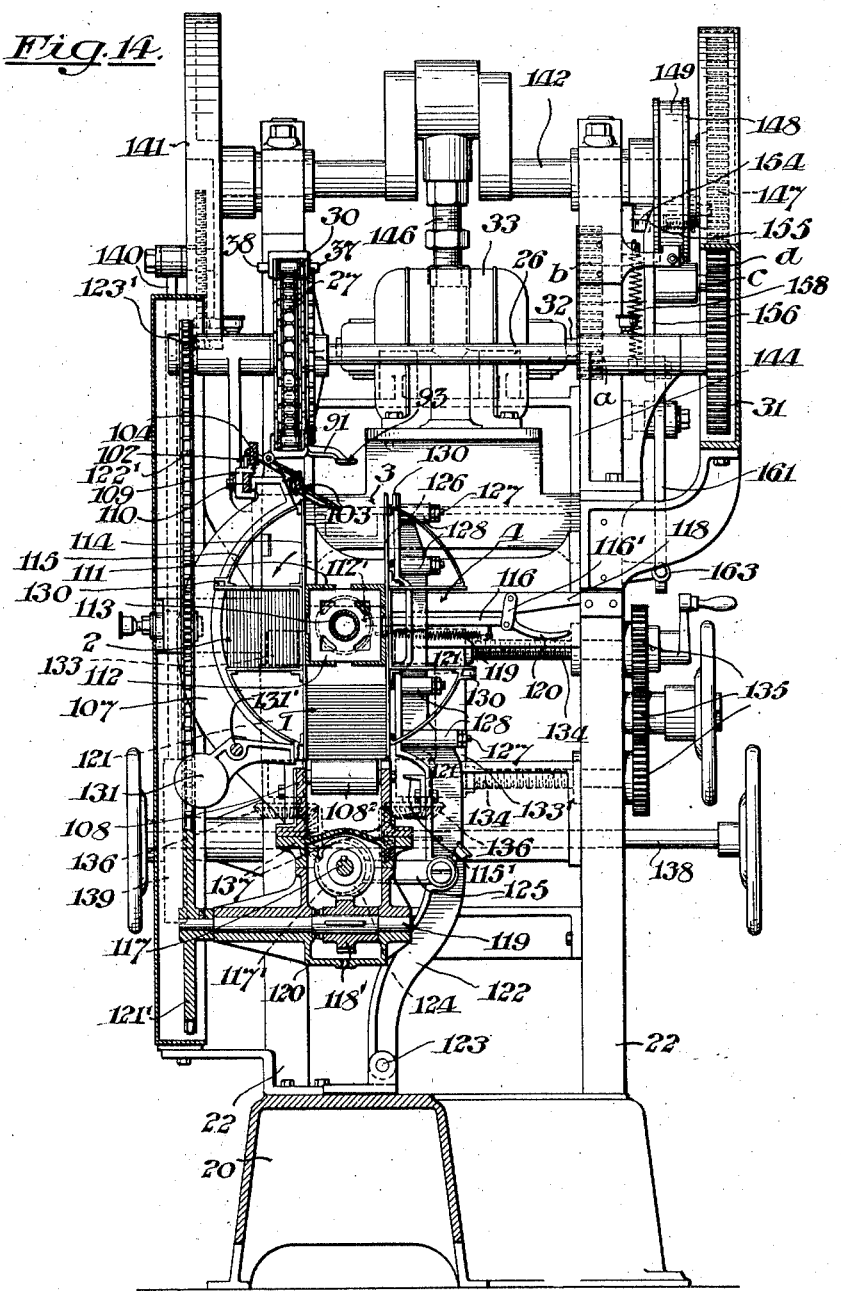

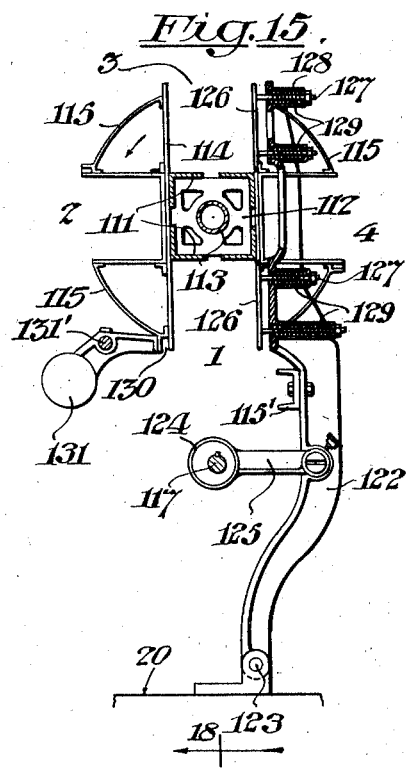

UNITED STATES PATENT OFFICE.

JOSEPH C. DONNELLY, OF BARBERTON, OHIO, ASSIGNOR TO THE DIAMOND MATCH COMPANY, OF CHICAGO, ILLINOIS, A CORPORATION OF ILLINOIS.

VENEER FEEDING AND HANDLING MACHINE.

1,360,275.   Specification of Letters Patent.   Patented Nov. 30, 1920.

Application filed March 29, 1919. Serial No. 286,153.

*To all whom it may concern:*

Be it known that I, JOSEPH C. DONNELLY, a citizen of the United States, and resident of Barberton, in the county of Summit and State of Ohio, have invented certain new and useful Improvements in Veneer Feeding and Handling Machines, of which the following is a specification.

This invention relates to a machine for automatically measuring, cutting and stacking long lengths of thin veneer material, such, for example, as is employed in the manufacture of the skillets or covers of small commercial match boxes.

The main object of my invention is the production of a machine of simple and efficient construction and operation whereby predetermined lengths are severed from veneer strips as rapidly as they are peeled from a log, and whereby such lengths are uniformly stacked and positioned for delivery to a skillet or other blank chopping machine.

Another object of my invention is to provide a veneer measuring, cutting and stacking machine in such coöperative relation to a blank chopping machine that as the blanks are being successively severed from one stack of veneer lengths, other similar lengths are being measured and cut from the veneer strips and being progressively stacked for subsequent delivery to the chopping machine.

With these and other objects in view my invention, generally stated, comprises veneer strip feeding mechanism; traveling gripper mechanism to which the veneer strips are delivered and by which gripper mechanism the veneer strips are grasped and conducted a predetermined distance, and cutter mechanism whereby the thus drawn material is severed from the strips to produce measured veneer lengths, said gripper mechanism being periodically operated to release the severed lengths and permit their delivery to a suitably-disposed receiving element.

The invention also comprises, in a veneer measuring, cutting and stacking machine, a magazine structure having a series of spaced compartments adapted to be successively positioned to receive a predetermined load or stack of veneer lengths as rapidly as they are produced.

The invention also comprises, in combination with the said magazine structure, a skillet or other blank chopping machine, to which the succeeding stacks of veneer lengths are delivered by the structure, which machine is so coördinated with the said structure and the veneer cutting and stacking mechanism that as skillet or other blanks are being severed from one stack of veneer lengths contained in one compartment of the structure, another quantity of veneer lengths is being produced and deposited in another compartment of the structure for subsequent delivery to the chopping machine, and so on.

The invention also comprises various novel features of construction and combinations of parts, all of which will be hereinafter described and claimed.

In the drawings—

Figure 1 is a side elevation of the left hand or receiving portion of a veneer measuring, cutting and stacking machine embodying my invention; showing the parts in the relative positions that they occupy immediately after the veneer strips have been pulled rearward by one of the grippers and released.

Fig. 2 is a longitudinal section, partly in elevation, of the right hand portion of the machine, showing its relation to the feeding and cutting mechanism of a skilled chopper.

Fig. 3 is a horizontal section, enlarged, as on the line 3—3 of Fig. 1.

Fig. 4 is a longitudinal vertical section through the receiving end of the machine, as on the line 4—4 of Fig. 3.

Fig. 5 is an elevation of the receiving end of the machine looking at the opposite side from Fig. 1, showing locking and releasing mechanism for the veneer feeding roll and cutter; and illustrating the parts in the relative positions which they occupy when a special link for releasing the said mechanism is initially engaging a trip-lever of the latter.

Fig. 5ª is a detail, in plan, of the special link and adjuncts.

Fig. 6 is a partial transverse vertical section through the receiving end of the machine, as on the line 6—6 of Fig. 4.

Fig. 7 is an elevation of a portion of the gripper conveyer and one of the grippers thereof during the rearward travel of the latter, showing parts of the parallel guide rails for the gripper.

Fig. 8 is a transverse section, as on the line 8—8 of Fig. 7.

Figs. 9, 10, 11 and 12 are diagrams illustrating successive relative operations of the feeding and cutting mechanisms at the receiving end of the machine, and also the corresponding operations of the conveyer and its grippers on the veneers.

Fig. 13 is a partial side elevation of the right hand or delivery portion of the machine, the gear casing being in section.

Fig. 14 is a transverse vertical section through the machine, as on the line 14—14 of Fig. 2.

Fig. 15 is a section through the magazine or turret structure, showing one of the beater bars and its actuating mechanism.

Fig. 16 is a partial horizontal section of the blank chopping machine, as on the line 16—16 of Fig. 13.

Fig. 17 is a sectional elevation of a form of clutch mechanism for the main shaft of the chopping machine.

Fig. 18 is a vertical section as on the line 18—18 of Fig. 17.

Referring to the drawings, 20 designates a long bed and 21, 22 frame standards at its respective ends, said bed and the standards 22 constituting in the present instance elements of an ordinary skillet blank chopping machine, as will presently appear. The standards 21, 22 support brackets 23, 24 which are equipped with bearings for two transverse parallel shafts 25, 26 to which are keyed counterpart sprocket-wheels 27, 27 respectively. Each of the sprocket-wheels 27 comprises two spaced toothed members, 28, 29, and may be an integral or two-part structure. Passing about the members 28 of the respective wheels 27 is an endless chain conveyer 30 which is continuously driven in any suitable manner so that the lower lead of the conveyer shall travel horizontally from the front to the rear of the machine, that is from left to right as illustrated in Figs. 1 and 2. In the present instance the shaft 26 has keyed on one end thereof a gear-wheel 31 which is included in a train of gears (Fig. 13) that are concurrently driven from the shaft 32 of a suitably-disposed electric-motor 33. The conveyer 30 is provided with two counterpart grippers 34, which are so located thereon as to divide the chain into two equal sections. These grippers constitute, in effect, a part of and travel with the conveyer, their function being to grip at successive periods during their travel the free ends of a series of superposed veneer strips, 35, as the latter are being peeled from a log by a veneer lathe; thence pull the superposed strips horizontally a prescribed distance, and then release them. The grippers and the mechanism for periodically operating them will be hereinafter described.

The conveyer is provided at a certain distance in advance of each gripper with a special link 36 having laterally projecting studs 37 which are adapted to mesh with the teeth of the outer members 29 of the sprocket-wheels 27 and thus be effectually supported and guided as the chain passes about the sprocket-wheels. The link is provided on its opposite side to the studs 37 with a lateral projection 38, constituting a wiper, which is adapted, as the link approaches and recedes from the receiving end of the machine, to determine the active and idle conditions of mechanisms for intermittently feeding the free ends of the superposed strips of veneer to the adjacent gripper and for thereafter, when such ends have been drawn rearward by the gripper, severing predetermined lengths from the strips, as will now be described.

On the front standards 21 is supported a horizontal table 39 (Fig. 4) provided preferably with a downwardly and forwardly flaring guide structure 40 by means of which a series of superposed strips of veneers, 35, are guided from an adjacent peeling machine to the table. A gravity dog 41 pivoted to a stud 42' on a forwardly extending arm 42 at one side of the table rests upon the uppermost strip of veneer adjacent the throat of the structure 40 and thus prevents the accidental retraction of the strips. The arm 42 is preferably pivoted to one side of the table so that the arm and the dog may be bodily raised to facilitate the initial delivery of the veneer strips to the guide structure, a suitably-arranged stop 43 being provided to limit the descent of the arm. An inclined cover plate 44 overlies the forward part of the table and constitutes, in effect, a continuation of the guide structure. The table is also provided with spaced overhanging cover plates 45 to afford an elongated guideway for the veneer strips. It is also formed with a transverse opening 46 therein for the passage of an idler feed roll 47 with which the under surface of the veneer stock contacts. The shaft 48 of this roll has its bearings in vertically-movable boxes 49 mounted in brackets 50 on the standard, which boxes are provided with usual spring and screw adjusting devices in order to position the roll in operative relation to the strips imposed thereon.

Spaced above the idler roll is an intermittently-rotatable milled feed roll 51, the effective periphery of which, excepting a reduced portion 52 thereof, contacts with and feeds the strips a definite distance during the active travel of the feed roll. The shaft 53 of the roll 51 is provided at one end with a gear-wheel 54 in mesh with an idler gear 55 on an adjacent stud shaft 56, which latter gear, in turn, is in mesh with a gear-wheel 57 on an adjacent rearward shaft 58 having its bearings in brackets 59 supported on the standards 21. The shaft 58 is extended somewhat beyond the table and is equipped with a sprocket-wheel 60 which is connected by means of a chain 61 with a sprocket-wheel 62 that is keyed on a sleeve 63 mounted to turn loosely on a bushing on the shaft 25 of the forward chain wheel 27, whereby when the said sleeve is temporarily rotated concurrently with the shaft 25, as will presently be described, the shafts 58, 53 are correspondingly actuated. A toothed tension wheel 62' supported by an arm 63' pivoted to a suitably-disposed bracket member, overhangs and bears upon the upper run of the chain 61.

On the shaft 58 is a face cam 64, the race of which receives a stud or roll 65 on a rock-frame 66 which, overhanging the shaft 58, is affixed to a horizontal pivot shaft 67 having its bearings in brackets 68 on the standards 21. The free end of this frame is connected to a vertically reciprocative head 69 carrying a depending knife 70 which is adapted by actuation of the frame to sever the veneer strips transversely when the latter are advanced into the path of the knife; the table 39 being appropriately slotted, as at 71', for the passage of the knife. The contour of the cam race is such that at a given point in the rotation of the shaft 58 the frame is quickly actuated in order to lower and raise the knife, the frame 66 thereupon remaining up until a succeeding complete rotation of the shaft; and the peripheral formation of the feed roll 51 is such that immediately after the severance of the veneer strips by the knife the roll contacts with the opposing strip and moves the series rearwardly a predetermined extent for engagement by one of the grippers 34 of the chain conveyer. At the same time the reduced peripheral portion 52 of the roll 51 advances above the veneer strips and the latter are thus free to be conducted rearwardly by the gripper. (See Figs. 9 to 12 inclusive).

Suitable means are provided to lock the shafts 58, 53 temporarily during the period that the veneer strips are being pulled, which means is preferably as follows: Fast on the extended end of the shaft 58 is a disk 71 having a suitably-disposed peripheral notch 72 with which a horizontal bolt 73 is adapted to be moved into and out of locking engagement. (See Figs. 3 and 5). This bolt is slidingly mounted in a casing 74 on the side of the adjacent bracket, and is connected by means of a rod 75 with a rock-arm 76 which is pivoted on a bracket 77 on the standard 21. The rod 75 extends freely through a guide-lug 75' on the bracket, and a spring 78, which encircles the rod and bears against the lug and a collar or projection 78' on the rod, tends to project the rod and bolt normally toward the locking disk 71. When the bolt is in registry with the notch of the disk the two shafts 58, 53 are locked. Mounted in a bearing on the bracket 77 is a horizontal rock-shaft 79 having at its ends upwardly and downwardly extending arms 80, 81 respectively. The lower end of the arm 81 extends adjacent to and has a pin-and-slot connection 82 with the rock-arm 76, and the upper end of the arm 80 extends adjacent the upper run of the conveyer 30 and bears an upstanding projection 83. This projection lies in the path of the wiper 38 on the special link 36 above mentioned as the latter approaches the forward end of the machine. (as seen in Figs. 5 and 5ᵃ), which wiper thus presses against the projection 83 and bodily swings the lever arm 80 forward, thus moving the rock-arm 76 and retracting the bolt from the locking disk in opposition to the action of the spring 78. The bolt is held in retracted position by means of a suitable dog 84, the tooth of which engages a shoulder 85 formed by a notch in the top of the bolt. This dog is pivoted to the casing, as at 86, its tooth being movable through an aperture in the latter and being normally depressed by the action of a spring-pressed T-rod 87 which extends through the casing and by its head engages the dog. The dog is provided with a tail-piece 88 which extends into the path of a cam fast on the end of the sleeve 63, which cam includes two diametrically opposite projections 89 which are so formed that in each rotation of the sleeve 63 they act successively upon the tail-piece to disengage the tooth of the dog from the retaining notch of the bolt.

Fast on the sleeve 63 is a double toe-head the members 90 of which are diametrically opposite to each other and are so located in relation to the wiper 38 of the link 36 that as the latter passes about the front wheel 27 the wiper abuts against one of the toe members and thus bodily turns the head, and therewith the sleeve 63, a half rotation. When the wiper escapes the engaged member the other member is in position for a similar action thereon by the wiper of the other special link when the latter reaches and as it rounds the forward sprocket-wheel 27. (See Figs. 9 to 12 inclusive).

Each of the grippers 34 to which the free ends of the veneer strips are advanced by the feed roll 51 as above described, comprises two complementary jaws one of which is supported in fixed relation to the conveyer while the other is hingedly mounted in the fixed jaw and is held in normal gripping relation thereto. (See Figs. 6, 7 and 8). The fixed jaw includes an arm 91 having spaced extended lugs 92 which constitute one of the chain links; the face of the arm adjacent its outer or free end having a toothed or serrated gripping member 93.

The movable gripper jaw comprises an arm 95 one end of which is hingedly connected to the fixed arm 91 by means of a pintle 96'; the other or free end of the hinged arm 95 having a toothed or serrated gripping member 96 in co-acting relation to the corresponding member 93 of the fixed jaw arm. The ends of the pintle are extended outwardly and provided with springs 97, each of which is oppositely engaged at its respective ends with studs on the arm 95 and on a fixed head 98 on the adjacent pintle end, whereby the hinged jaw is held normally in gripping relation to the fixed jaw. Set screws 99 are mounted in the arm 95 so as to bear against the fixed arm and thus permit minute adjustment of the bite of the gripping jaws, as desired. The inner end of the arm 95 is provided with an extension 100 adapted to bear against a segmental cam member 101 as the gripper is being carried by the chain around the forward sprocket-wheel. (See Figs. 1, 3 and 4.) This cam member is supported on the standards 21 and its curved acting surface is so formed and disposed in relation to the path of the conveyer that as the extension contacts with and passes along such surface the movable gripper jaw is swung open in opposition to the closing action of the springs 97. When the gripper has been carried directly beneath the forward wheel 27 the jaws are fully open and the free ends of veneer strips are entered between them and released by the action of the feed roll 51. Thereupon the extension 100 escapes the cam 101, and the hinged jaw, being released, automatically resumes its normal condition and perforce clamps the strips between the jaws. The gripper in its continued travel pulls the strips horizontally toward the rear of the machine, and as the said gripper approaches a predetermined limit in its travel the knife (70) is actuated as previously described to sever the veneer lengths from the body of the strip. (See Fig. 10.) The gripper continuing its travel carries the severed veneer lengths a short distance farther, whereupon the extension 100 rides upon a suitably-disposed cam piece 102 (Figs. 2, 8 and 13) and is thereby raised to swing open the hinged jaw and release the engaged strips, which latter thereupon drop bodily into an intermittently-rotatable magazine or turret structure which will be hereinafter described.

When the gripper escapes the cam 102 the hinged jaw resumes its closed position, and the gripper passes around the rear sprocket-wheel 27 and continues its travel to the forward end of the machine for a repetition of the gripping and pulling operations upon the incoming veneer strips. As one gripper escapes the strips at the rear of the machine the other gripper approaches the forward end of the machine, as seen in Fig. 12, and in its travel about the front sprocket-wheel the latter gripper is acted upon and opened by the cam member 101 preparatory to closing upon and grasping the leading ends of the veneer strips which have been timely advanced by the feed roll 51 immediately after the severing operation by the knife as previously described. In other words the free ends of the veneer strips as they come from the peeling machine are caught by the forwardly positioned gripper, and such strips, by virtue of the relative position of the feed roll 51 thereon, being unrestrained, are drawn rearward by the said gripper to the position indicated in Fig. 10, and the knife is thereupon instantly actuated to sever the prescribed length from the strips. The feed roll 51 then immediately engages the leading ends of the strips, as seen in Fig. 11, and advances them for engagement by the succeeding gripper, as seen in Fig. 12, and at the same time the severed strips are carried sufficiently rearward by the preceding gripper to a position where the gripper is opened and the severed strips released, as illustrated in Fig. 12. Thus the feed roll intermittently advances the free ends of the strips to gripping position; the grippers act in alternation upon said strips to draw them a measured distance; the knife severs succeeding lengths from the strips when they have been drawn rearward to the prescribed extent, and each gripper carries the severed lengths to a position for delivery to the underlying turret structure.

Supported adjacent to and longitudinally of the conveyer are a pair of spaced parallel rails 103, 104 which coöperate with the lower gripper jaws to maintain them positively in gripping condition during their progress with the veneer strips. (See Figs. 1, 2, 7, 8, 13 and 14.) The rail 103 is arranged beneath the lower run of the conveyer, and its upper edge is shaped to receive and guide recessed portions 105 formed in the swinging arms of the respective grippers; and the rail 104 is disposed in a higher plane so as to overhang the extension 100 as the grippers travel rearward. Thus the two rails co-act with the swinging gripper jaws as and when the latter grip the veneers and progress therewith. The forward or receiving ends of the rails are preferably slightly flared, as at 106, to permit the passage of the grippers to and between the rails.

In the present instance the rails are supported by posts 107 which are bolted at their lower ends to the side bars 108 of the horizontal veneer supporting bed of the skillet blank chopping machine, and the cam piece 102 previously referred to for opening the grippers in order to release the severed veneer lengths, is formed on a bracket 109 which is bolted to a rearwardly extending bar 110 that is conveniently affixed to one of the supporting posts for the rails. The bars 108, which are supported by standards 108' rising from the bed, bear a series of spaced anti-friction rollers 108² upon which stacks of veneer lengths are successively deposited by the turret structure, the preferred form of which will now be described.

The turret structure is mounted on a horizontal axis directly beneath and parallel to the lower run of the conveyer, and it includes four spaced elongated compartments that are adapted by the intermittent rotation of the structure to be positioned successively beneath the conveyer and thus receive the severed strips of veneer; each compartment when loaded being advanced by two-quarter turns of the structure to a reverse position in order to discharge, by gravity, its load upon the veneer supporting bed of the skillet chopper. (See Figs. 1, 2, 13, 14 and 15.)

The turret structure herein illustrated comprises four relatively long angle irons 111 that are affixed to a series of rectangular center blocks 112 arranged at intervals along a shaft 113 which has its bearings in suitable boxes on the main standards 21, 22, the whole constituting a rotary skeleton frame having four elongated sides. The walls of the compartments are comprised by suitably-arranged plates 114 which are affixed to the angle irons; each wall being made up of a series of corresponding plate sections spaced apart throughout the length of the rotary frame, and the outer sides of adjacent plates being connected by segmental braces 115.

For convenience of description the compartments are designated 1, 2, 3 and 4 in Figs. 14 and 15. At the outset the turret is disposed with its compartment 1 in receptive position for the strips of veneer as they are being drawn out and cut, as above described; such operations being continued until the compartment is filled. Thereupon the turret is moved a quarter-turn in the direction indicated by the arrow in Fig. 14, i. e. contra-clockwise—so as to shift the filled compartment from and advance an empty compartment (2) beneath the conveyer, which latter compartment is then supplied with strips of veneer similarly to the immediately preceding compartment. This done, the turret is again partially rotated to bring the third compartment (3) to filling position directly beneath the conveyer, thus reversing the first filled compartment directly above and positioning its contents on the underlying roller bed of the chopping machine.

It is to be noted that the posts 107 above referred to are segmental in form, as shown in Fig. 14, in order to permit the rotation of the filled compartments and also to serve as guards to prevent the displacement of the stacks of veneer strips during the travel of the compartments from their upright to their inverted position.

The turret is temporarily locked at the end of each rotary movement by means of a bolt 116 (Fig. 14) which is adapted to engage a suitably-disposed orifice 112' in a hub on the spacing block 112 at the rear end of the turret. In the present instance the bolt comprises a bar which is pivotally suspended by means of a link 116' from a suitably-disposed cross-bar 118 on the main frame, the inner end of the bolt bar being held normally in locking position by means of a spring 119 which is secured thereto and to a fixed portion of the machine. The outer end of the bolt is provided with a suitable handle 120 to facilitate the manual retraction of the bolt.

When the compartment 1 is first filled the bolt is retracted to release the turret, and the latter is moved by hand to bring the second compartment to filling position, but after the second compartment has been filled the overbalancing weight of the stack of veneers contained in the first compartment automatically rotates the turret, when the latter is unlocked, to bring the third compartment to upright or filling position, and so on.

When the stack of veneers in one compartment is imposed on the roller bed, such stack is advanced by hand, or otherwise, into engagement with the usual vertical feed-rolls 121 of the chopping machine, and the machine is clutched into action; whereupon the stack of veneers is drawn longitudinally through the skillet chopper until the inverted compartment is emptied. At the same time the upright compartment is being filled. Thus in the intermittent rotation of the turret each succeeding empty compartment is brought to upright or filling position and then advanced to an inverted position directly above the roller bed of the chopping machine.

During the filling and chopping operations the banks of veneer strips in the upright and inverted compartments of the turret are evened up by beater mechanism which preferably comprises a series of upstanding vibratory bars 122 pivoted, as at 123, to brackets on the frame bed 20 so as to extend adjacent to one side of the turret. The bars 122 are spaced correspondingly with the wall plates 114 of the adjacent compartments and are movable in proximity to the spaces of the latter, said bars being connected by a beam 115' and being movable as a unit.

Mounted in suitably-disposed bearings beneath the roller bed of the skillet chopper is a shaft 117 which extends longitudinally of the bed. On the rear end of this shaft is a gear 117' in mesh with a gear 118' on a transverse shaft 119 having its bearings in a bracket casing 120' depending from the bed. On one end of the shaft 119 is a sprocket-wheel 121' which is connected by means of a chain 122' with a sprocket-wheel 123' on the rear shaft 26 of the gripper conveyer, whereby during the operation of the latter shaft, motion is transmitted to the shaft 117. On the shaft 117 are suitably-disposed eccentrics 124 (in the present instance four) which are connected by rods 125 with the adjacent beater bars 122, so as to effect the oscillation of the latter as above described.

The upper or acting portions of the respective bars are preferably provided with yielding bearing members 126 which are constructed and arranged to contact with the opposing edges of the superposed veneer strips in the vertically-disposed compartments of the turret. In the present instance these members comprise vertical plates affixed to horizontal pins or bolts 127 which are slidingly fitted in perforated bearings 128 on the bar, said bearings being socketed to receive springs 129 which press against pins or projections on the pins or bolts 127. (See Fig. 15). The yielding plates during the inward impulses of the bars 122 act against the opposing veneer strips and force them squarely against the opposite sides of the two compartments.

I preferably provide the walls of the compartments with outward projections 130 with which engage a series of suitably-disposed weighted pawls 131 at the end of each intermittent movement of the turret so as to prevent retrograde movement of the latter; the forward movement of the turret being positively checked by the contact of the veneer strips of the lowermost compartment against the beater plates. The pawls are mounted at intervals on a rod 131' extending lengthwise of the machine and supported in bearings on the posts 107.

The chopping machine with which my improved stacking mechanism is associated may be of any usual or approved construction. In the present instance I have illustrated a known form of skillet blank chopping machine, which need not be specifically described. It includes a table 132 which is supported on the standards 22 in the same horizontal plane as the tops of the rollers 108², one of the standards providing a vertical guide wall against which a side of the stack is supported and guided as the strips are advanced to the path of the usual reciprocating chopping knife 143. (See Figs. 2 and 16.) The vertical feed rolls 121 extend above the top of the table, one being mounted in fixed bearings 133 exteriorly of the adjacent standard so as to extend through a vertical slot in the guide wall, and the other being mounted in a bearing carriage 133' which is adjustable transversely of the table to vary the space between the rolls as desired. The adjustment of the carriage is effected by parallel screw-shafts 134 operatively connected by intermeshing gear-wheels 135 as usual. (See Figs. 14 and 16.) The lower studs of the feed rolls are provided with bevel gear-wheels 136 which mesh with similar wheels 137 on a transverse shaft 138 having its bearings in the standards 22; the gear-wheel 137 which meshes with the gear-wheel of the adjustable roll on the carriage being splined on the shaft 138 so as to be movable along the latter. On one end of the shaft 138 is secured a disk 139 which is operatively connected by means of a rod 140 with a crank-disk 141 on the crank-shaft 142 of the chopper; whereby during each complete rotation of said shaft 142 the shaft 138 and therewith the feed rolls 121 are properly rotated to advance the stack of veneers a predetermined distance; it being noted that the crank-pin is adjustable toward or from the center of the disk to determine the extent of advancement of the veneer stack.

A pivoted presser foot 142' carried by an arm 143' which is hung from a rocker shaft 144' mounted in the standards 22, bears upon the top of the stack of veneer lengths as and when the stack engages the feed rolls. The shaft 144' is provided with an exterior crank handle 145' whereby the arm and its foot can be readily thrown into and out of the path of the veneer stack, as desired. (See Figs. 2 and 13.)

In each advance of the stack of veneer lengths skillet blanks are severed therefrom by the vertically-reciprocating knife 143 which is carried by a cross-head 144 mounted in suitable guideways 145 on the standards 22. The cross-head is connected by means of a rod 146 with the crank-shaft 142 as usual, which shaft is intermittently clutched to a continuously rotating driving gear 147 that is normally loose thereon. This gear is positively driven from the motor shaft 32 through a suitable train of gearing comprising, in the present instance, a gear $a$ on the motor shaft meshing with a gear $b$ on an adjacent shaft $c$ which bears a gear $d$ in mesh with the gear 147. Motion is also transmitted from the gear $a$ through intermediate gears $e$ to the gear 31 on the rear conveyer shaft 26; and hence the conveyer and the gear 147 are simultaneously driven from the motor. (See Figs. 2, 13 and 14.)

The effective connection between the crank-shaft and the gear 147 is accomplished by a regulation punch-press clutch which is designed to effect the release of the crank-shaft on its highest point of travel. The construction of the form of clutch shown in Figs. 13, 14, 17 and 18 is briefly as follows: Fast on the shaft 142 adjacent the gear 147 is a friction wheel 148 about which passes a friction band 149, one end of which is secured to a fixture on the framework and the other end to an adjustable spring-retracted pin 150 which is slidingly mounted in an orifice in said fixture. Slidingly mounted in a transverse aperture in the friction wheel is a clutch pin 151 which is movable into and out of registry with a suitably-disposed socket 152 in the hub of the gear 147. A spring 153 secured to the wheel 148 and to a lug on the clutch pin 151 holds the latter normally in engaging position with relation to the socket in the gear hub. On a lateral stud on the clutch pin is a roll 154 which lies in the path of a segmental cam head 155 on a vertically movable bar 156 which is fitted to guides 157 on the adjacent frame standard and is held normally raised by means of a spring 158 that is secured to the bar 156 and to the standard. On the lower end of this bar is a stud 159 which extends into the path of the hook-shaped upper arm 160 of a hand lever 161 which is fulcrumed on a stud 162 on the standard; the construction being such that by manually swinging the lower or handle end of the lever outward, the hook thereof engages the stud 159 and thus lowers the bar 156 and locks it in down position, thereby removing the cam 155 from the roll 154 of the clutch pin and permitting the latter to engage the socketed hub of the gear 147, as seen in Figs. 17 and 18. When the lever 161 is manually forced down (as seen in Fig. 13) it releases the bar 156 and allows the cam to engage the roll of the clutch pin and thus disengage the latter from the continuously rotating gear 147. 163 is simply a suitably-disposed spring-pressed stop for the handle lever when the latter is in down position.

The coöperative relation of the clutch elements is such that when the cam bar is elevated as above mentioned the clutch pin is positively retracted thereby when the crank of the crank-shaft is at the highest point of its rotation, said shaft thus being released from the gear 147. The action of the brake-band 149 upon the brake-wheel 148 is so adjusted as to prevent an over-run of the crank-shaft with any desired speed of the chopper.

The successive operations of the chopping machine are effected by the timely manipulation of the handle lever 161; the lower stack of veneers which rests on the horizontal roller bed beneath the turret being intermittently advanced by the feed rolls 121 to determine the length of the severed skillet blanks. When said stack has been wholly withdrawn from the adjacent compartment of the turret the latter makes a partial turn as above described and deposits a succeeding stack of veneer lengths on the roller bed of the chopper, which stack is thereupon advanced to the feed rolls 121, and intermittently impelled across the path of the reciprocating knife 143 similarly to the preceding stack; and so on.

It is to be understood that my invention is not limited to the specific constructions herein disclosed, as the mechanism may be modified within the principle of the invention and the scope of the appended claims.

I claim—

1. The combination with means for intermittently engaging and feeding veneer strips as they are delivered from a veneer peeling machine, of traveling mechanism, including a gripper, arranged in spaced relation to said engaging and feeding means, actuating means whereby said gripper is caused to grip said strips and draw them lengthwise a predetermined distance, means for severing the measured lengths from the strips, said severing means being spaced between the strip engaging and feeding means and the path of the traveling mechanism, and means for actuating the gripper to release the severed lengths.

2. The combination with means for intermittently engaging and feeding veneer strips as they are delivered from a veneer peeling machine, of an endless conveyer arranged in spaced relation to said engaging and feeding means, means for driving said conveyer, a gripper on said conveyer, means for actuating said gripper whereby it is caused to grip the said strips and draw them lengthwise a predetermined distance, means for severing the measured lengths from the strips, said severing means being spaced between the strip engaging and feeding means and the path of the conveyer, and means for actuating the gripper to release the severed lengths.

3. The combination with means for intermittently engaging and feeding veneer strips as they are delivered from a veneer peeling machine, of an endless conveyer arranged in spaced relation to said engaging and feeding means, means for driving said conveyer, a normally closed gripper on said conveyer, means for temporarily opening said gripper and then permitting it to close and grasp the strips, whereby said strips are pulled lengthwise a predetermined distance, means for severing the measured lengths from the strips, said severing means being spaced between the strip engaging and feeding means and the path of the conveyer, and means for temporarily opening the gripper to release the severed lengths.

4. The combination of means for intermittently engaging and feeding strips as they are delivered from a veneer peeling machine, of traveling mechanism, including a gripper, actuating means whereby said gripper is caused to grip said strips and draw them lengthwise a predetermined distance, means for severing measured lengths from the strips, means for locking said feeding and said severing means in idle position while the strips are being drawn lengthwise by the gripper, means for actuating said locking means to release said feeding and said severing means when the strip lengths have been measured, and means for actuating the gripper to release the severed lengths.

5. The combination with means for engaging and feeding strips as they are delivered from a veneer peeling machine, said means including a feed roll and means for intermittently rotating the same, of traveling mechanism, including a gripper, actuating means whereby said gripper is caused to grip said strips and draw them lengthwise a predetermined distance, means, including a reciprocating cutter, for severing the measured lengths from the strips, means for locking said roll and said cutter in idle position while the strips are being drawn lengthwise by the gripper, means for actuating said locking means to release the roll and cutter when the strip lengths have been measured, and means for actuating the gripper to release the severed strips.

6. The combination with means for intermittently engaging and feeding veneer strips as they are delivered from a veneer peeling machine, of an endless conveyer, means for driving the same, a gripper on said conveyer, means for actuating said gripper whereby it is caused to grip the said strips and draw them lengthwise a predetermined distance, means for severing the measured lengths from the strips, means, including a trip member, for locking said feeding and said severing means in idle position while the strips are being drawn lengthwise by the gripper, means for actuating said locking means to release said feeding and said severing means when the strip lengths have been measured, said releasing means including a rotary element for periodically engaging the said trip member, and a device on the conveyer for actuating said element; and means for actuating the gripper to release the severed lengths.

7. The combination with means for engaging and feeding veneer strips as they are delivered from a veneer peeling machine, said means including a feed roll and means for intermittently rotating the same, of traveling mechanism, including a gripper, actuating means whereby said gripper is caused to grip said strips and draw them lengthwise a predetermined distance, means, including a reciprocating cutter, for severing the measured lengths from the strips, a locking member rotatable with the feed roll, a bolt member normally in locking relation to said member, lever connections for said bolt member, a wiper device on the conveyer for actuating said connections to retract said bolt member from locking position, a dog for retaining said bolt member retracted, said dog having a trip portion, and a rotary element for periodically engaging said trip portion, said element being actuated by the said wiper device.

8. The combination with means for intermittently engaging and feeding veneer strips as they are delivered from a veneer peeling machine, of an endless conveyer, means, including a forward sprocket-wheel, for supporting and driving said conveyer, a gripper on said conveyer, means for actuating said gripper whereby it is caused to grip the said strips adjacent said sprocket-wheel and draw them lengthwise a predetermined distance, means for severing the measured lengths from the strips, means for locking said feeding and said severing means in idle position while the strips are being drawn lengthwise by the gripper, means for actuating said locking means to release said feeding and said severing means when the strip lengths have been measured, said releasing means including a wiper element on the conveyer having laterally projecting studs, and a sprocket-wheel member associated with the forward sprocket-wheel and adapted to receive and support the studs of the wiper element as the latter passes about the said sprocket-wheel.

9. The combination with means for engaging and feeding veneer strips as they are delivered from a veneer peeling machine, of an endless conveyer, means for driving the same, two grippers mounted on said conveyer in spaced relation to each other, means adjacent the front end of said conveyer for actuating said grippers in succession whereby each gripper is caused to grip the said strips at certain intervals and draw them lengthwise a predetermined distance, means for severing the measured lengths from the strips, means, including bolt and dog devices, for locking said feeding and said severing means in idle position while the strips are being drawn lengthwise by each gripper, means for actuating said locking means to release said feeding and said severing means when the strip lengths have been measured, said releasing means including two wiper devices arranged on the conveyer in spaced relation to the respective grippers and adapted successively to effect the retraction of the bolt devices, and a rotary double-toe element for periodically operating the dog device, said toe element being successively actuated by said wiper devices.

10. The combination with means for intermittently engaging and feeding veneer strips as they are delivered from a veneer peeling machine, of an endless conveyer arranged in spaced relation to said engaging and feeding means, means for driving said conveyer, a gripper on said conveyer comprising normally closed jaw members, one of which is movable relatively to the other and is provided with an end extension, a cam member in the path of said extension whereby the movable jaw member is opened and then permitted to grip the said strips and draw them lengthwise a predetermined distance, means for severing the measured lengths from the strips, said severing means being spaced between the strip engaging and feeding means and the path of the conveyer, and a cam arranged in the path of said extension after the strips have been severed, whereby the movable gripper jaw is opened to release the severed lengths.

11. The combination with means for intermittently engaging and feeding veneer strips as they are delivered from a veneer peeling machine, of an endless conveyer arranged in spaced relation to said engaging and feeding means, means for driving said conveyer, a gripper on said conveyer comprising normally closed jaw members one of which is movable relatively to the other and is provided with an end extension, a cam member in the path of said extension whereby the movable jaw member is opened and then permitted to grip the said strips and draw them lengthwise a predetermined distance, spaced parallel guide bars with which said extension and jaw member contact during the active travel of the gripper, means for severing the measured lengths from the strips, said severing means being spaced between the strip engaging and feeding means and the path of the conveyer, and a cam arranged in the path of said extension after the strips have been severed, whereby the movable gripper jaw is opened to release the severed lengths.

12. The combination with means for intermittently engaging and feeding veneer strips as they are delivered from a veneer peeling machine, of an endless conveyer arranged in spaced relation to said engaging and feeding means, means for driving said conveyer, two grippers mounted on said conveyer in spaced relation to each other, means adjacent the front end of the conveyer for actuating said grippers in succession whereby each gripper is caused to grip the said strips and draw them lengthwise a predetermined distance, means for severing the severed lengths from the strips, said severing means being spaced between the strip engaging and feeding means and the path of the conveyer, and means for successively actuating the said grippers to release the severed lengths.

13. The combination with means for intermittently engaging and feeding veneer strips as they are delivered from a veneer peeling machine, of traveling mechanism, including a gripper and actuating means therefor, whereby said gripper is caused to grip the said strips and draw them lengthwise a predetermined distance, means for severing the measured lengths from the strips, means for actuating the gripper to release the severed lengths, and a movable structure having a series of stacking compartments adapted to be brought successively into the path of the descending veneer lengths thus released by the gripper.

14. The combination with means for intermittently engaging and feeding veneer strips as they are delivered from a veneer peeling machine, of traveling mechanism, including a gripper and actuating means therefor, whereby said gripper is caused to grip the said strips and draw them lengthwise a predetermined distance, means for severing the measured lengths from the strips, means for actuating the gripper to release the severed lengths, and an intermittently rotatable turret structure having a series of spaced stacking compartments adapted to be brought successively into the path of the descending veneer lengths thus released by the gripper.

15. The combination with means for intermittently engaging and feeding veneer strips as they are delivered from a veneer peeling machine, of traveling mechanism, including a gripper, actuating means whereby said gripper is caused to grip the said strips and draw them lengthwise a predetermined distance, means for severing the measured lengths from the strips, means for actuating the gripper to release the severed lengths, an intermittently rotatable turret structure having a series of spaced stacking compartments adapted to be brought successively into the path of the descending veneer lengths thus released by the gripper, and means for temporarily locking said turret at the end of each of its rotary movements.

16. The combination with means for intermittently engaging and feeding veneer strips as they are delivered from a veneer peeling machine, of traveling mechanism, including a gripper, actuating means whereby said gripper is caused to grip the said strips and draw them lengthwise a predetermined distance, means for severing the measured lengths from the strips, means for actuating the gripper to release the severed lengths, an intermittently rotatable turret structure having a series of spaced stacking compartments adapted to be brought successively into the path of the descending veneer lengths thus released by the gripper, and means for evening the contents of the said compartments.

17. The combination with means for intermittently engaging and feeding veneer strips as they are delivered from a veneer peeling machine, of traveling mechanism, including a gripper, actuating means whereby said gripper is caused to grip the said strips and draw them lengthwise a predetermined distance, means for severing the measured lengths from the strips, means for actuating the gripper to release the severed lengths, an intermittently rotatable turret structure having a series of spaced stacking compartments adapted to be brought successively into the path of the descending veneer lengths thus released by the gripper, beater bars adjacent the path of said compartments, and means for oscillating said bars against the contents of the said compartments.

18. The combination with means for intermittently engaging and feeding veneer strips as they are delivered from a veneer peeling machine, of traveling mechanism, including a gripper and actuating means therefor whereby said gripper is caused to grip the said strips and draw them lengthwise a predetermined distance, means for severing the measured lengths from the strips, means for actuating the gripper to release the severed lengths, an intermittently rotatable turret structure having a series of spaced stacking compartments adapted to be brought successively into the path of the veneer lengths thus released by the gripper, a bed beneath said turret adapted to support the stacks of veneer lengths contained in successively inverted compartments, and means for removing the said lengths longitudinally from the bed.

19. The combination with a veneer blank chopping machine, including a veneer supporting bed, and veneer feeding and chopping mechanisms, of means for intermittently engaging and feeding veneer strips as they are delivered from a veneer peeling machine, traveling mechanism including a gripper, actuating means whereby said gripper is caused to grip said strips and draw them lengthwise a predetermined distance directly above and longitudinally of said bed, means for actuating the gripper to release the severed lengths, and a stacking structure interposed between said traveling mechanism and bed and constructed and arranged to receive said strips and deposit them in stacks upon the bed.

Signed at Savannah, in the county of Chatham and State of Georgia, this 24th day of March, A. D. 1919.

JOSEPH C. DONNELLY